United States Patent [19]
Bock et al.

[11] 3,877,820
[45] Apr. 15, 1975

[54] ALTERNATING LIGHT PHOTOMETER

[75] Inventors: Hartmut Bock, Fischbach, Taunus; Werner Melzer, Liederbach; Helmut Schroeder, Hofheim; Leo Schupmehl, Liederbach, all of Germany

[73] Assignee: Kalle Aktiengesellschaft, Wiesbaden-Biebrich, Germany

[22] Filed: Oct. 5, 1973

[21] Appl. No.: 403,799

[30] Foreign Application Priority Data
Oct. 5, 1972 Germany............................ 2248781

[52] U.S. Cl. ............... 356/229; 250/574; 250/575; 356/104; 356/205; 356/212
[51] Int. Cl. .......................................... G01n 21/22
[58] Field of Search ......................... 250/573–576; 356/204–206, 104, 209–212, 229

[56] References Cited
UNITED STATES PATENTS
| | | | |
|---|---|---|---|
| 1,999,023 | 4/1935 | Sharp et al.......................... | 356/211 |
| 2,970,513 | 2/1961 | Waters............................. | 250/575 X |
| 3,091,690 | 5/1963 | McHenry........................ | 250/575 X |

FOREIGN PATENTS OR APPLICATIONS
873,563 7/1961 United Kingdom................. 356/211

Primary Examiner—Ronald L. Wibert
Assistant Examiner—F. L. Evans
Attorney, Agent, or Firm—Richard L. Schwaab

[57] ABSTRACT

Disclosed is an alternating light photometer comprising a light source, first and second measuring stations including means for holding material to be measured, first and second paths permitting illuminating light emitted by the light source to reach the first and second measuring stations, a light receiver, third and fourth paths permitting measuring light emanating from the first and second measuring stations to reach the light receiver, and means permitting light emanating from the first measuring station and light emanating from the second measuring station to alternately reach the light receiver. In the apparatus, the light source, the two measuring stations, and the light receiver together define a tetrahedron, the light paths are preferably formed as hollow tunnels, and the measuring stations, light paths and other elements are preferably arranged symmetrically to a central plane of symmetry.

15 Claims, 3 Drawing Figures

ALERNATING LIGHT PHOTOMETER

BACKGROUND OF THE INVENTION

The present invention relates to a photometer and more especially to an alternating light photometer comprising a light source, a light receiver and a device which permits light influenced by a test sample and light influenced by a reference material to alternately reach the light receives.

In the electrophotographic field, and in particular in high-speed electrophotographic reproduction machines, there exists the problem that part of the developer composition is removed from the apparatus by the copies as they are produced, thereby causing a depletion of developer. Therefore, the quantity of substance taken from the developer supply by the copies must be replaced if copies of uniform quality, in particular of uniform darkness, are to be produced over a relatively long period of time. Numerous processes and apparatuses have already been proposed for this purpose. The purpose of all these processes is to determine the depletion of developer material, either directly or indirectly, and to restore an appropriate quantity of the depleted substance to the developer mixture.

In one, yet unpublished, solution of this problem an alternating light photometer was used for this purpose. Basically, such an alternating light photometer is operated by illuminating a sample of electrophotographic developer with a light source and intercepting the scattered light by means of a photoelectric cell. Immediately in front of the developer sample, there is arranged a circular shutter consisting of two blades which have blackened surfaces. These blackened blades serve as reference sample. When the shutter disk consisting of the two blades is rotated, the photoelectric cell alternately receives light scattered by the developer and light scattered by the circular shutter disk. A change in the composition of the developer, therefore, causes a change in the electrical signal of the photoelectric cell.

Although this construction has the essential advantage of being extremely simple, it was not satisfactory as regards the accuracy of measurement and universal applicability to other processes and devices requiring photometric measuring means.

SUMMARY OF THE INVENTION

It is an object of the present invention to provide an alternating light photometer which is very simple in its construction and which may be readily and inexpensively manufactured.

Another object of the present invention is to provide an alternating light photometer which is capable of being installed as a standard component of electrophotographic copying machines, and which, at the same time, may be used generally, without substantial alteration in its construction, for measuring colors, for measuring the solids content of liquids, and for measuring fluorescent excitation.

In accomplishing the foregoing objects, there is provided in accordance with the present invention an alternating light photometer comprising a light source, first and second measuring stations including means for holding material to be measured, first and second paths permitting illuminating light emitted by the light source to reach the first and second measuring stations, a light receiver, third and fourth paths permitting measuring light emanating from the first and second measuring stations to reach the light receiver, and means permitting light emanating from the first measuring station and light emanating from the second measuring station to alternately reach the light receiver. In the apparatus, the light source, the two measuring stations, and the light receiver together define a tetrahedron. The light paths are preferably formed as hollow tunnels containing no lenses and the two measuring stations, the two paths for illuminating light, the two paths for the measuring light, and the corresponding tunnels are preferably constructed and arranged in such a manner that they are mirror-symmetrical to the plane (plane of symmetry) in which the light source and the light receiver are positioned and with which the straight line connecting the measuring stations (i.e., corresponding points of the measuring stations) is at a right angle.

Alternatively, the geometry of this alternating light photometer may be defined in that the centers of the light source, of the two measuring stations, and of the light receiver define a tetrahedron (possibly deformed) and in that the tetrahedron is preferably positioned in mirror symmetry to the plane which is defined by the light source, the light receiver, and the central point of the straight line connecting the centers of the two measuring stations. This symmetry applies not only to the geometrical arrangement, but also to each of the constructional units, such as the light source, the receiver for the measured light, and the tunnels, which are constructed so that they too are symmetrical relative to this plane.

Owing to this symmetrical construction of the present alternating light photometer, it is generally adaptable for use in other devices requiring photometric measurement means. It has proved to be of particular advantage for measuring the toner concentration in a two-component electrophotographic developer powder mixture; however, differences in the color of various samples, different compositions of liquids, and other similar differences may also be determined with the photometer of this invention. Most advantageously, the present invention provides a double-beam alternating light photometer which can be manufactured in a simple and inexpensive manner, which may be used for a wide variety of purposes without changes in its construction, and which permits considerable accuracy in measurement. In particular, the toner concentration in electrophotographic apparatuses may be determined with an exceptional degree of accuracy. In addition, when the composition of the developer mixture used in an electrophotographic apparatus is changed within the customary limits, no re-calibration of the present photometer is necessary. All that is necessary is to replace the reference sample of the developer mixture.

In a particularly simple construction of the photometer according to the present invention, the two paths for the illuminating light converge at an acute angle as they extend from the measuring stations back to the light source, and the two paths for the measuring light likewise converge in an acute angle as they extend from the measuring stations to the light receiver. Preferably, an incandescent bulb is used as the light source and a photoelectric cell as the light receiving device.

If the alternating light photometer is sealed by windows at the measuring stations and the light scattering of a test sample or a reference sample arranged behind the windows is to be measured, the paths for the illuminating light and the paths for the measuring light advantageously strike the windows at angles which are substantially outside the condition of reflection.

It has proved to be of particular advantage to select for the illuminating light path an angle between about 30° and 60° from a line normal to the surface of the measuring station window, in which case the measuring light path should have an angle relative to normal of about 0°. Conversely, it is possible to use an angle between about 30° and 60° to the normal for the measuring light path and an angle of about 0° to the normal for the illuminating light path.

If the unit consisting of the light source and the two paths for the illuminating light and the unit consisting of the light receiver and the measuring light paths are arranged in such a manner that they can be swiveled about an axis passing through the two measuring stations and being vertical to the plane of symmetry, the alternating light photometer of the invention may also be used as a transmitted light photometer, for example by using mirror-coated trays in the measuring stations and operating within the condition of reflection. In this case, the light receiver "sees" the light source through the appropriate paths and the mirror.

A conventional interrupting device consisting of a paddle wheel has proved to be particularly suitable for the photometer according to the present invention. This paddle wheel is rotatable and is arranged within the photometer in a manner such that the paddles and intervals between paddles of the paddle wheel are of equal size and that the axis of rotation of the paddle wheel is disposed in the aforementioned plane of symmetry.

In a preferred embodiment, the paddle wheel is arranged in a position where the measuring light paths are still separate and in which the individual paddles and the distances between paddles have the shape of radial sections, the length of the arc of these sections being equal to the sum of the width of one measuring light path or tunnel (both paths being of equal dimensions) and the distance between the two measuring light paths, when measured along a line passing through the centers of the light paths or tunnels. This construction provides that a uniform condition is produced at the light receiver when the measuring conditions at the two measuring stations are identical. In this case, the photoelectric cell indicates pure direct current. Only when the conditions existing at one measuring station are varied from those existing at the other measuring station is an alternating current signal produced, the frequency of which corresponds to the frequency of the alternating paddles of the paddle wheel.

It has been found to be advantageous to form the light paths for the measuring light and for the illuminating light as tunnels, and preferably in the form of cylindrical tubes. The device according to the present invention is especially sturdy and reliable when the tubes consist of bores in a single, solid block.

For the determination of toner concentration, it is of particular advantage if in front of the measuring stations there are provided windows equipped with retaining funnels through which the electrophotographic developer mixture is allowed to trickle. In this manner, the varying toner concentration of an electrophotographic reproduction machine may be measured continuously and under conditions which remain constant over several days, and the signal of the photoelectric cell may be used in a simple manner for re-dosing the toner.

Finally, in a preferred embodiment of the present invention, the photometer further comprises a zero point shutter which is so constructed and arranged within the device that by turning or displacing the shutter, the cross-section of one of the light paths may be slightly enlarged or reduced as compared with the other path. This shutter serves the purpose of equalizing any asymmetries which cannot be entirely avoided in the manufacture of such devices, so that when the conditions on the measuring stations are identical, pure direct current is actually measured at the light receiver.

Further objects, features and advantages of the present invention will become apparent from the following detailed description of a specific embodiment thereof, when considered together with the attached drawings.

Figure 1:
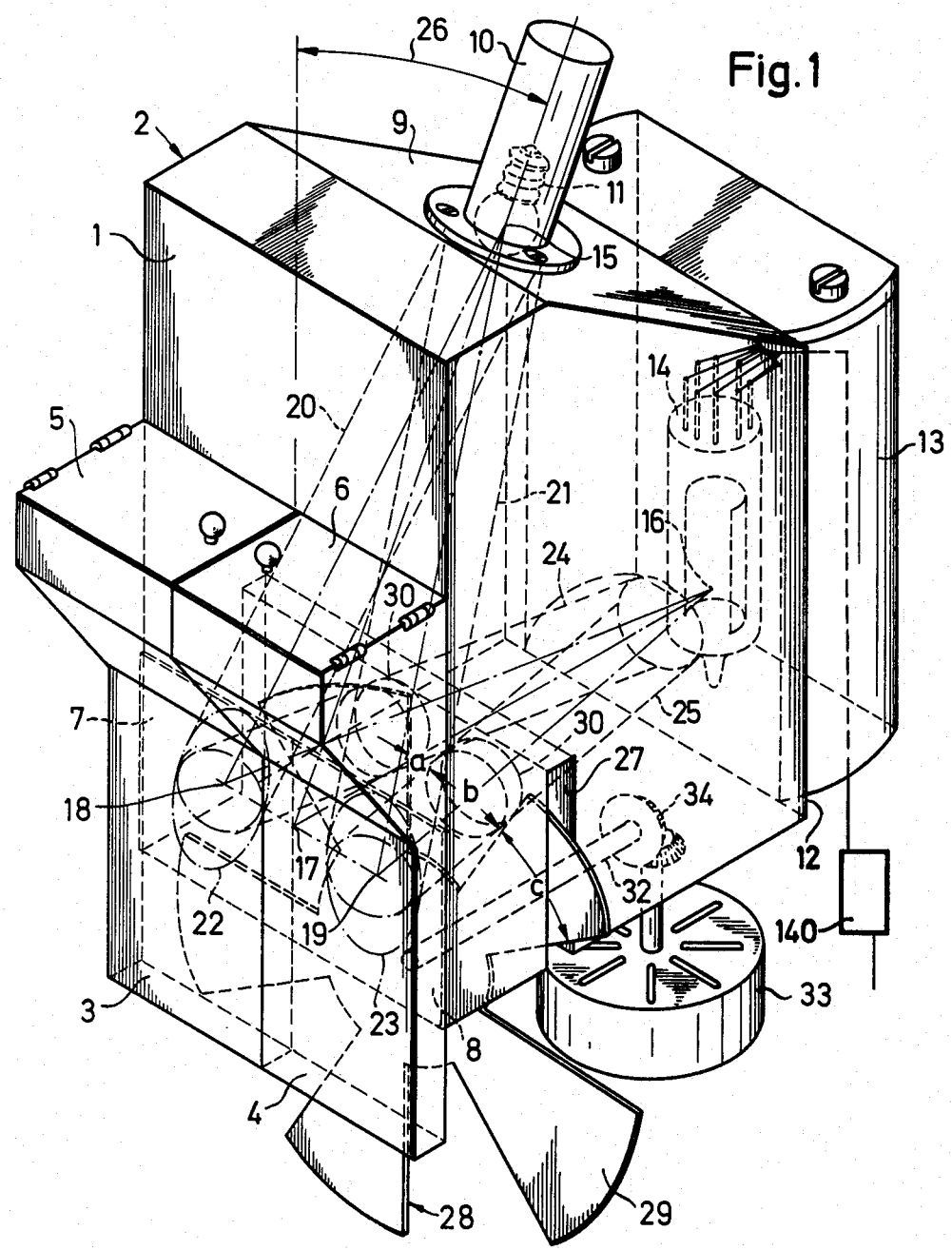
FIG. 1 is a diagrammatic perspective view of a photometer according to the invention, showing internal details in broken lines.

At the front end 1 of an aluminum block 2 there are attached two trays 3 and 4. The two trays are provided with funnel-shaped hoppers 5 and 6 and have windows 7 and 8 on the surfaces facing the actual photometer. Below the funnel-shaped hoppers 5 and 6, i.e., in the region of tray windows 7 and 8, the trays are in the form of flat parallelepipeds. To the roof-like slanting top 9 of the aluminum block is screwed a socket 10 which holds a bulb 11. At the rear side 12 of the aluminum block, a housing 13 is mounted which contains a photoelectric cell 14.

To understand the following description of the geometry of the photometer, it is necessary to first define a plane of symmetry. This plane is visualized as extending through the center 15 of the bulb 11, the center 16 of the photocell 14, and the central point 17 between the two measuring stations 18 and 19. All functional elements of the photometer according to the invention are arranged and constructed symmetrically to the plane defined by these three points.

The aluminum block 2 contains two bored tunnels 20 and 21 which begin at the location of the bulb 11 and are arranged so that they extend symmetrically to the above defined plane of symmetry. These bores extend obliquely through the aluminum block and emerge at the location of the tray windows. The surfaces of the tray windows illuminated by the bulb are indicated by the ellipses 22 and 23.

Furthermore, two bores 24 and 25 originating from the location of the photoelectric cell penetrate the aluminum block 2 and are likewise arranged so that they are symmetrical to the above-defined plane of symmetry. These bores meet upon the tray windows in substantially the same region as the tunnels 20 and 21 for the illuminating light. The common area of the front surface appertaining to one of the illuminating tunnels 20 and 21 and to one of the measuring light tunnels 24 and 25 define the actual measuring stations 18 and 19. The angle 26 between the plane extending through the two illuminating light tunnels and the front surface 1 is about 30°, whereas the plane extending through the two measuring light bores 24 and 25 strikes the front surface 1 of the aluminum block — and thus the windows of the trays — at substantially a right angle.

A slot 27 is arranged in the lower part of the aluminum block 2. This slot is dimensioned so that a modulator paddle wheel 28 rotating therein alternately closes and opens the measuring light tunnels 24 and 25, depending upon whether one of the paddles 29 or one of the intervals between paddle blades is in the modulator openings 30.

The slot 27 is cut into the aluminum block 2 at a location where the two tunnels 24 and 25 are separated from each other by a bridge having a width ($a$). The width ($c$) of the modulator blade 29 and of the intervals between the modulator blades equals the sum of ($a+b$), ($b$) being the width of the modulator opening 30 or of one of the measuring light tunnels 24 and 25. The widths ($a$), ($b$), and ($c$) are measured along the circumference of a circle whose center coincides with the center of the modulator wheel and whose radius corresponds to the distance from the center of the wheel to the centers of the tunnels. In order to adjust as accurately as possible to the condition ($a+b$)=($c$), the axis of the modulator wheel is mounted, together with its drive, in such a way that it can be radially adjusted in the direction of the modulator openings 30. The axis of rotation 32 of the modulator wheel lies in the above-defined plane of symmetry. The paddle wheel is driven by an electromotor 33 through a bevel gear arrangement 34.

The bores 20, 21, 24, and 25 are polished on the inside. The alternating light photometer according to the present invention utilizes no lenses and can thus be produced in a particularly inexpensive manner, although the device itself is extremely reliable and exact. Preferably, only tunnels are used to guide the light from the light source to the measuring stations then to the light receiving device, so that calibration and adjusting problems are substantially avoided.

Figure 2:
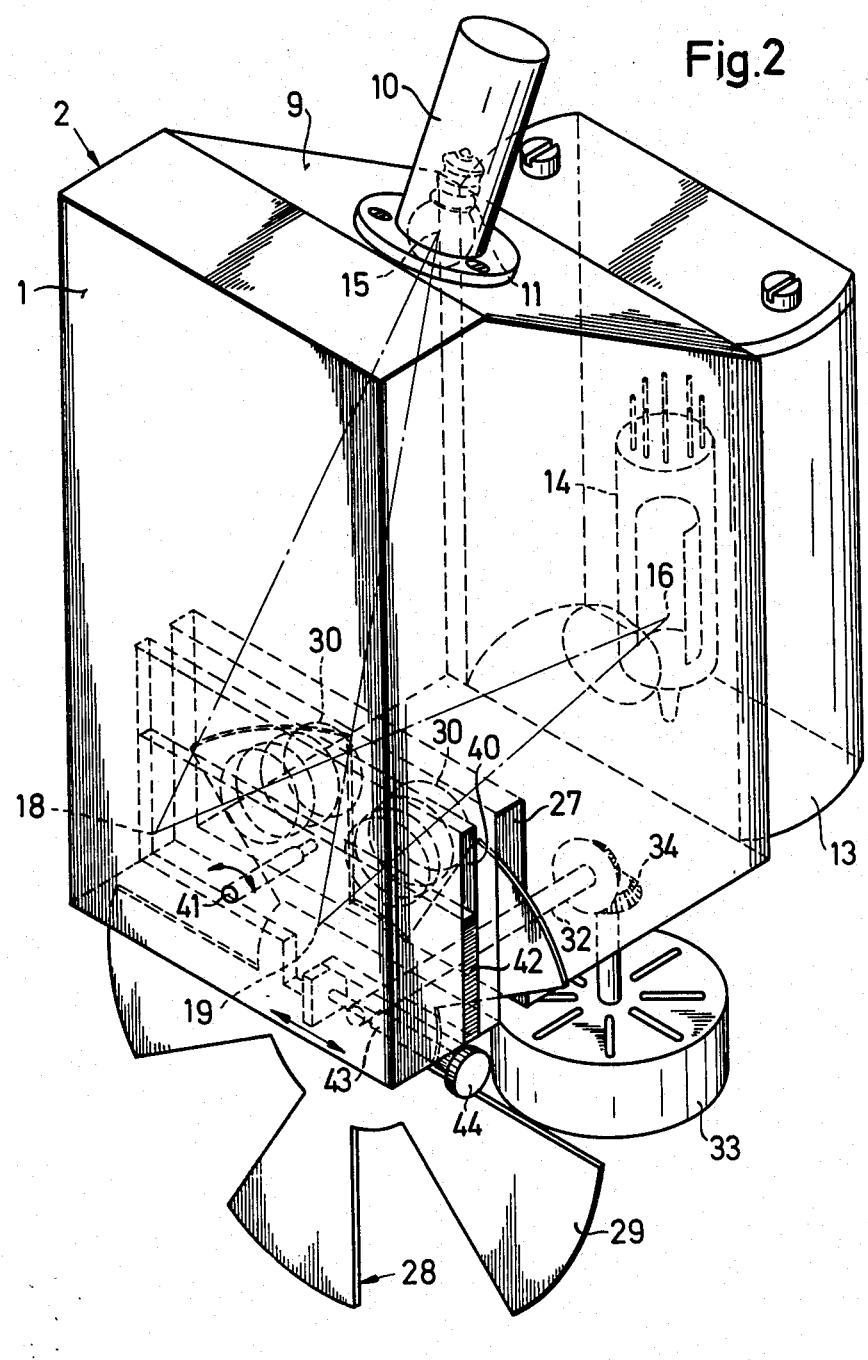
FIG. 2 is a detail of a photometer of the invention, showing the zero point shutter.

A zero point shutter may be provided, as shown in FIG. 2, in order to initially equalize any minor asymmetries occurring during manufacture. For this purpose, a second slot 40 extending parallel to the slot 27 is cut into the block 2. This slot houses a shutter blade 42 which can be turned about an axis of rotation 41 also lying in the aforementioned plane of symmetry. The shutter blade 42 may be moved by means of a spindle 43 which may be adjusted from the outside by means of a small wheel 44. In this manner, the shutter blade 42 may be cautiously rotated around its axis 41 to render the two measuring light tunnels optically symmetric.

Advantageously, the entire device may be constructed so that it is sealed in a dust-tight manner with respect to the measuring unit and the other surroundings. This is particularly desirable when the device is to be used in an electrophotographic apparatus.

Figure 3:
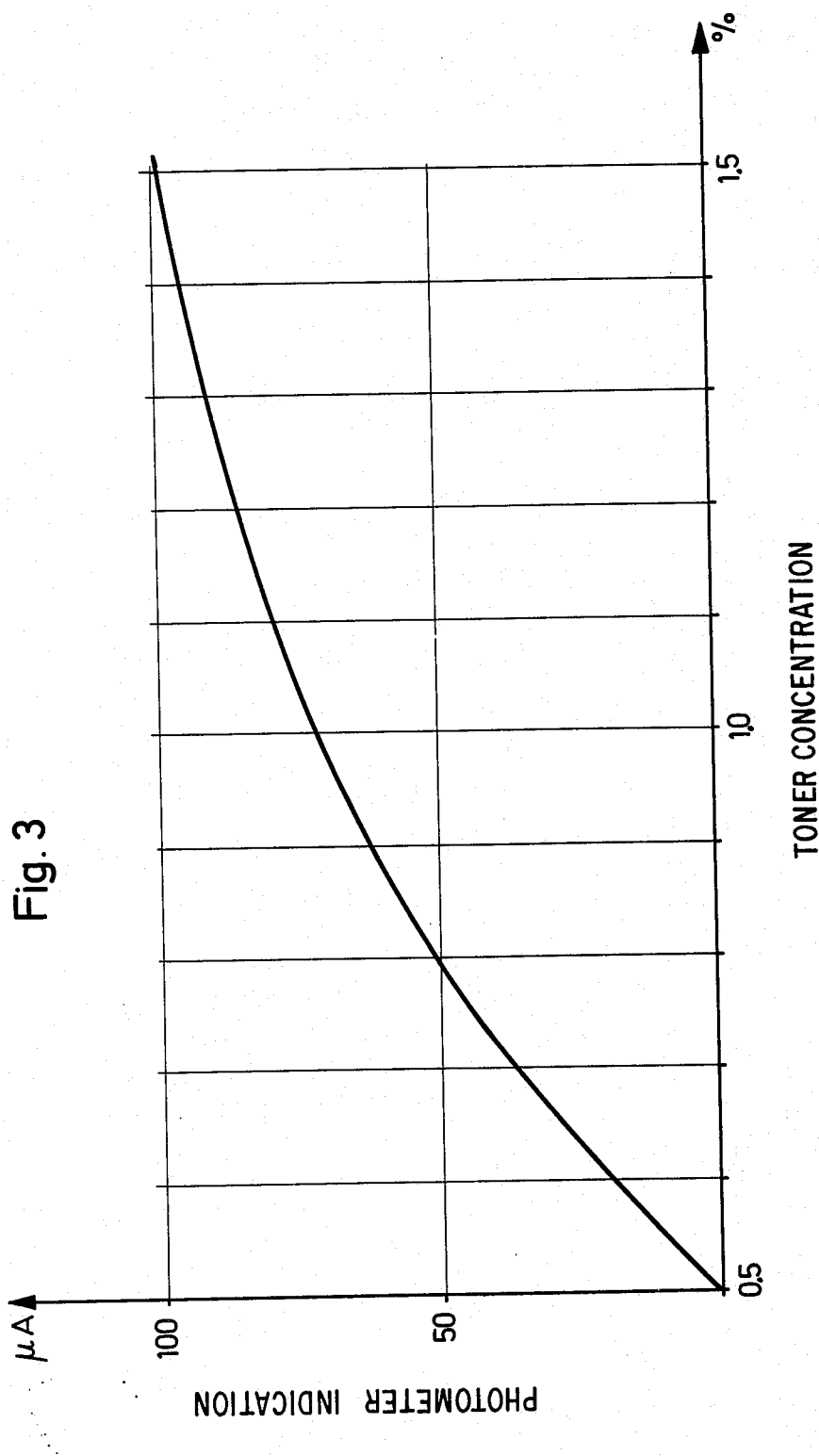
FIG. 3 is a calibration curve of the device.

The following test was performed with the above described photometer:

A two-component electrophotographic developer powder consisting of tiny glass balls and 0.5 per cent by weight of thermoplastic toner material was filled into the reference tray 3. Similar developer powders having different concentrations of toner were filled into the test tray 4. After rectification, and as a function of the toner concentration, the direct current amplitude shown in FIG. 3 was measured at the outlet end of the photoelectric amplifier.

In practice, for example in electrophotographic reproduction machines, it is preferred to fill the material having the desired concentration of toner (theoretical value) into the reference tray. In this case, the measuring signal is rectified in proper phase relation. For adjustment, the size and direction of the deviation of the measured signal from the theoretical signal (zero) is used. In this manner, changes in the sensitivity (due to the aging of the light source or the photoelectric cell, or to changes in amplification, temperature influences and the like) have no negative effect; no zero point displacement occurs.

These measurements were also conducted as extended time measurements, and it was found that even over a period of many days, no disturbing fluctuations in the measured values could be detected.

Thus, there has been provided according to the present invention an alternating light photometer which is universally applicable and lends itself, with particular advantage, to the determination of toner concentration in electrophotographic developer powders.

Since various modifications in the above-described invention will become obvious to a person skilled in the art without departing from the spirit of the invention, it is to be explicitly understood that the scope of protection is to be determined solely by the appended claims.

What is claimed is:

1. An alternating light photometer comprising a light source, first and second measuring stations including means for holding material to be measured, first and second paths permitting illuminating light emitted by the source to reach the first and second measuring stations, said first and second paths diverging from one another in the direction from the light source to said measuring stations, a light receiver, third and fourth paths permitting measuring light emanating from the first and second measuring stations to reach the light receiver, said third and fourth paths converging toward one another in the direction from said measuring stations to said light receiver and means permitting light emanating from the first measuring station and light emanating from the second measuring station to alternately reach the light receiver, wherein the plane joining the light source and the two measuring stations, the plane joining the light source, the first measuring station and the light receiver, the plane joining the light source, the second measuring station and the light receiver, and the plane joining the two measuring stations and the light receiver form a tetrahedron, and wherein the first and second measuring stations, the first and second paths for illuminating light, and also the third and fourth paths for measuring light are arranged in such a manner that they are mirror-symmetrical to a plane defined by the centers of the light source and the light receiver and being at a right angle with a straight line connecting corresponding points of said measuring stations.

2. The alternating light photometer according to claim 1, wherein said first through fourth paths comprise hollow tunnels.

3. The alternating light photometer according to claim 1, wherein the first and second paths for the illuminating light converge at an acute angle when followed from the measuring stations to the light source and wherein the third and fourth paths for the measuring light converge at an acute angle when followed from the measuring stations to the light receiver.

4. The alternating light photometer according to claim 1, wherein said paths for the illuminating light and said paths for the measuring light are arranged substantially outside of the condition of reflection relative to said measuring stations.

5. The alternating light photometer according to claim 4, wherein the paths for the illuminating light form an angle of from about 30° to 60° with the measuring stations and the paths for the measuring light form an angle of approximately 90° with the measuring stations.

6. The alternating light photometer according to claim 1, wherein the light source is an incandescent bulb and the light receiver is a photoelectric cell.

7. The alternating light photometer according to claim 1, wherein said means permitting light from the first and second measuring stations to alternately reach the light receiver comprises a rotatable paddle wheel arranged within the device in such a manner that the axis of rotation of the paddle wheel lies in said plane of symmetry and that the paddles and the intervals between paddles alternately close and open the third and fourth paths for the measuring light.

8. The alternating light photometer according to claim 7, wherein the paddle wheel is mounted in a position in which the third and fourth paths for the measuring light are still separate and wherein the width ($c$) of the paddles and the width of the intervals between the paddles of the paddle wheel are each equal to the sum of the width ($b$) of the third or fourth paths for the measuring light and the distance ($a$) between the third and fourth paths for the measuring light, the distances ($a$), ($b$), and ($c$) being measured along the circumference of a circle whose center corresponds to the center of the paddle wheel and whose radius corresponds to the distance from the center of the paddle wheel to the centers of the third and fourth paths for the measuring light.

9. The alternating light photometer according to claim 1, further comprising
a casing,
a socket for an incandescent bulb detachably fastened to the casing, and
a housing for a photoelectric cell detachably fastened to the casing,
and wherein said first and second paths and said third and fourth paths comprise, respectively,
two tunnels extending in divergent directions from the location of the light source and
two tunnels extending in divergent directions from the location of the light receiver, each pair of tunnels leading to said measuring stations,
and wherein said holding means at the first and second measuring stations comprise trays.

10. The alternating light photometer according to claim 9, wherein said tunnels are in the form of circular cylindrical tubes.

11. The alternating light photometer according to claim 10, wherein the casing consists of a solid block.

12. The alternating light photometer according to claim 11, wherein the block is an aluminum block and the circular cylindrical bores are polished.

13. The alternating light photometer according to claim 9, wherein said trays are constructed as retaining funnels and are of substantially rectangular cross-section.

14. The alternating light photometer according to claim 1, further comprising means for the optical balancing of the measuring light tunnels.

15. The alternating light photometer according to claim 1, further comprising means connected with the light receiver for rectifying the output signal thereof.

* * * * *

UNITED STATES PATENT OFFICE
CERTIFICATE OF CORRECTION

PATENT NO. : 3,877,820
DATED : April 15, 1975
INVENTOR(S) : Hartmut Bock, Werner Melzer, Helmut Schroeder and Leo Schupmehl It is certified that error appears in the above-identified patent and that said Letters Patent are hereby corrected as shown below:

Cover page, column 1, change the assignee from "Kalle Aktiengesellschaft, Wiesbaden-Biebrich, Germany" to -- Hoechst Aktiengesellschaft, Frankfurt/Main, Germany --.

Column 1, line 9, change "receives" to -- receiver --.

Column 4, line 32, after "of" insert -- the --.

Signed and sealed this 1st day of July 1975.

(SEAL)
Attest:

RUTH C. MASON
Attesting Officer

C. MARSHALL DANN
Commissioner of Patents
and Trademarks